G. W. C. LOMB.
VEHICLE TIRE.
APPLICATION FILED JUNE 16, 1919.

1,389,766.

Patented Sept. 6, 1921.

INVENTOR.
George W. C. Lomb.
BY
ATTORNEYS

UNITED STATES PATENT OFFICE.

GEORGE W. C. LOMB, OF COVINGTON, KENTUCKY.

VEHICLE-TIRE.

1,389,766.         Specification of Letters Patent.         Patented Sept. 6, 1921.

Application filed June 16, 1919. Serial No. 304,564.

*To all whom it may concern:*

Be it known that I, GEORGE W. C. LOMB, a citizen of the United States, and a resident of Covington, in the county of Kenton and State of Kentucky, have invented certain new and useful Improvements in Vehicle-Tires, of which the following is a full, clear, and exact description, reference being had to the accompanying drawings, forming part of this specification.

My invention relates to means for protecting pneumatic or resilient tires against the wear of the road, puncturing, rim-cuts, blow-outs, stone bruises, and thus prolonging the useful life of the tire.

In devices of this type there is a rather wide range of structures, running from metallic knobs set closely into a pneumatic or resilient tire, to metal covers which entirely surround the tire and are secured to the felly of the wheel. Of the various devices with which I am familiar, there are several which are practical, within certain limits, and should add considerable life to a pneumatic or resilient tire, but the true principle upon which tire protectors operate and the true action of a semi-rigid metallic rim set over a resilient or pneumatic tire have not been understood, or applied, in the manufacture of a metallic-protected tire, which will stand up under road conditions, and those of the past are not practical, because of their excessive noise, excessive size, excessive weight, excessive number of parts or high cost of manufacture.

It is the object of my invention to provide a vehicle tire having a pneumatic or resilient body, and around the body to set a demountable metal ring, which is not of sufficient depth to reach to the center of the curve of the tire, but acts rather as a tread only. It is also my object to provide this metal tread with an outer surface of rubber, or fabric and rubber, so as to add quietness, better traction and some resiliency to the metal tread itself. I find that there is no necessity of providing attaching means for the metal ring to the felly of the wheel, nor that there is any necessity of making the metal portion so as to conform to a large portion of the body of the tire, since it has been the result of my investigations that a rim built with enough of a concave to fit the tread of the tire, when inflated, will never be displaced from the tire due to the flattening of the tire as pressure becomes low, or due to sudden jars or bumps on the road. One of the reasons for this is that the rigid rim when pressed upwardly toward the hub of a wheel, will impart an inward pressure to a tire over which it is mounted, all the way from the portion in contact with the ground to the horizontal plane of the wheel hub, whereas it relieves the balance of the tire from pressure and permits it to expand to equalize the inward pressure on the other portion.

I have found also that there is little or no tendency of a semi-rigid metallic tread set on a pneumatic or resilient tire to creep thereon, but that such a tread fitted over the tire, really forming a part of the casing of the tire, will remain permanently in position, although unattached to the casing. When the tire is in use and inflated, the extra pressure exerted by the tire proper against the metal tread will hold it firmly against creeping, and in fact a deflation which would be ruinous to normal tires will not bring about any displacement of the metal tread portion when the tire is in use.

The objects noted and other advantages which will be duly indicated, I accomplish by that certain construction and arrangement of parts to be hereinafter more specifically pointed out and claimed.

The casing 1 of any suitable structure, as found upon the market today, is employed in my invention, and the form selected may be smooth and without any specially reinforced tread, since such is unnecessary when my invention is employed.

The casing is provided with a metal ring 2 which is concaved in cross section, so as to fit what would correspond to the tread portion of said casing, and preferably of no greater width than necessary to cover considerably less than the outer half of the casing portion. The metal ring may be made of the desired thickness, or general outer conformation, since the general conformation of the inner surface of the ring with the tread portion of the casing portion of the tire, is the main consideration. In fact, the ring is readily applicable and valuable, whether the tread is rough or smooth, plain or reinforced, as a perfect fit is not essential.

Figure 1:
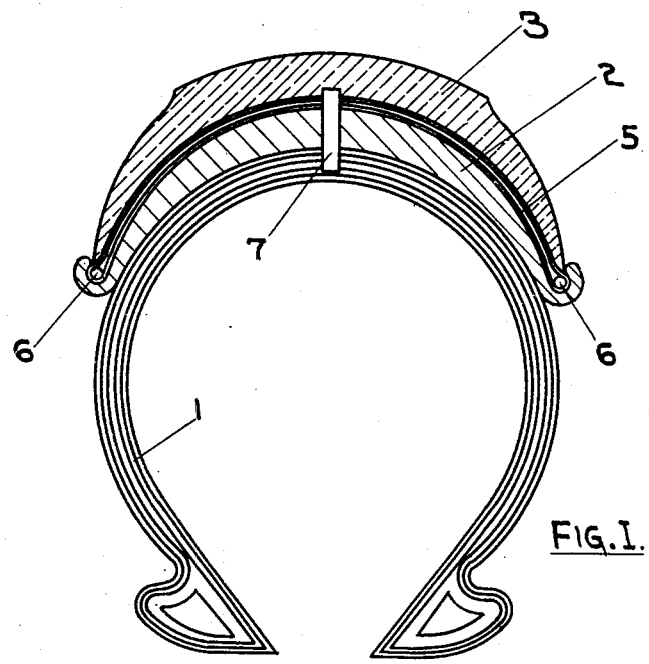
Figure 1 is a cross section of a tire showing my novel construction.
Figure 2:
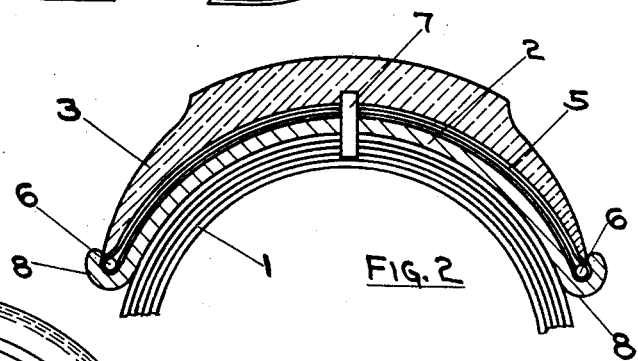
Fig. 2 is a like view in detail showing a slightly different shape of the metal and rubber tread portions of the tire.
Figure 3:
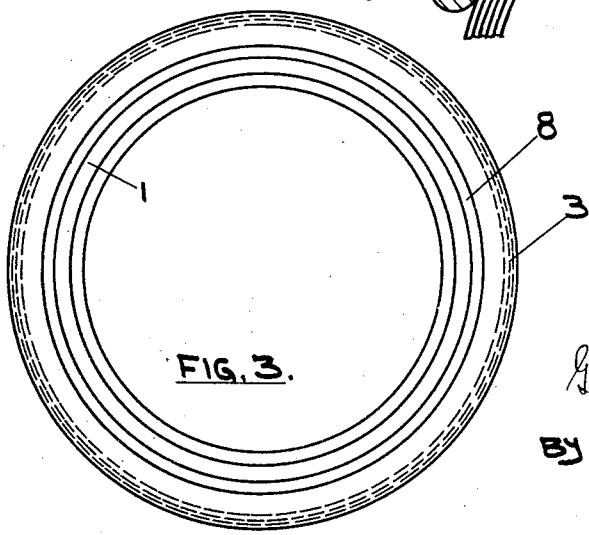
Fig. 3 is a side elevation of a tire embodying my invention.

The metal ring in Fig. 1 is thus of a different outer conformation from that shown in Fig. 2, but this does not affect the nature of the invention herein.

Mounted over the metal ring, I prefer to have the rubber tread 3. The preferred manner of uniting this rubber tread with the metal is to curve outwardly and roll upwardly the lateral edges of the ring 2, as shown at 4, and form the rubber tread with a fabric backing 5, firmly united with the rubber during the process of manufacture, and with peripheral wires 6 around which the fabric is thoroughly wound, or otherwise attached.

Such a rubber tread will be normally made up in long pieces, and cut into suitable lengths and bent around the metal ring. By drawing back the fabric and rubber from the ends of the wires 6, sufficient free extension of the wires may be obtained to provide a joint between the wires, by welding or other secure attachment, after which the fabric and rubber will be vulcanized together, thereby forming a unitary rubber tread securely mounted over the metal.

The metal ring should be tempered to a sufficient degree to prevent the denting of the ring, and the rolled out edges of the ring prevent rim-cutting, while permitting freedom for the tire to bulge at the sides. Thus the rolled edges serve as a protection to the tire at the sides and provide a metal channel for the wires 6 of the rubber tread.

It can be observed that the tread and casing now described, form a tire which is an article of manufacture, as well as a combination of structures. It will be possible to equip used tires with the metal ring and tread as a demountable protective shell. This is one of the points of my invention, particularly due to the fact that the tire may be but partially inflated during use. Thus a very old tire equipped with my ring and run at comparatively low pressure will last indefinitely, while the rubber tread on the ring can be renewed when desired. The nature of the tread of the old tire is not essential, although it should be trimmed smooth before applying the ring, for the best results.

My invention may be used with tires of which the treads are more or less worn, and those of which the treads are worn down into the fabric, as well as new tires made with treads on them and new tires made without built-up treads upon them. In the above specification, I have merely stated my preferred form.

One of the advantages of my invention is its convenience of application. The operator merely deflates the inner tube, slips the protecting ring over the tire, squares it into place and inflates the tire again.

It is also one of the advantages of my invention, as above noted, that by its use, very light air-pressure is required, thus very greatly prolonging the life of the casing and rendering it possible to obtain many thousands of miles of service from casings which otherwise would have been long since relegated to the junk-pile.

I do not desire the claims to be limited by the above description because of the failure to point out in every instance what features are essential to the invention and what are not, since in the claims I shall state the nature of my invention without intention to include more therein than the fair construction of the words allows.

The use of my new invention is of obvious value in the prevention of punctures, rim-cuts, stone bruises, and blow-outs, and in the general saving of the casing from wear and tear. In some instances I desire to have dowel pins 7 inserted through the metal ring and welded firmly in place, and set into holes formed for them in the casing or body portion of the tire. This will prevent slipping of the parts on each other. The pins may be omitted altogether, however, or may extend through any two adjacent parts of the tire as desired. I will ordinarily employ three of the dowels, equally distributed throughout the tires.

Having thus described my invention, what I claim as new and desire to secure by Letters Patent, is:—

A tire protector for pneumatic tires comprising in combination with a pneumatic tire, a metal rim of arc-shape in cross section, and of a size to cover less than the half circle of said tire, said rim having rolled edges to form a channel protected at the sides, and a cushioned tread for said metal rim comprising a vulcanized fabric body and wire reinforcements at the edges of said body, said wire reinforced portions of the body being adapted to seat in and be protected by said channel and a solid rubber facing for the vulcanized fabric, said facing terminating short of the wire reinforced portion, whereby it does not extend into the channel.

GEORGE W. C. LOMB.